Feb. 12, 1957
O. M. BROWNING
2,780,977
AUTOMATIC BEDDING MARKER
Filed Dec. 20, 1955
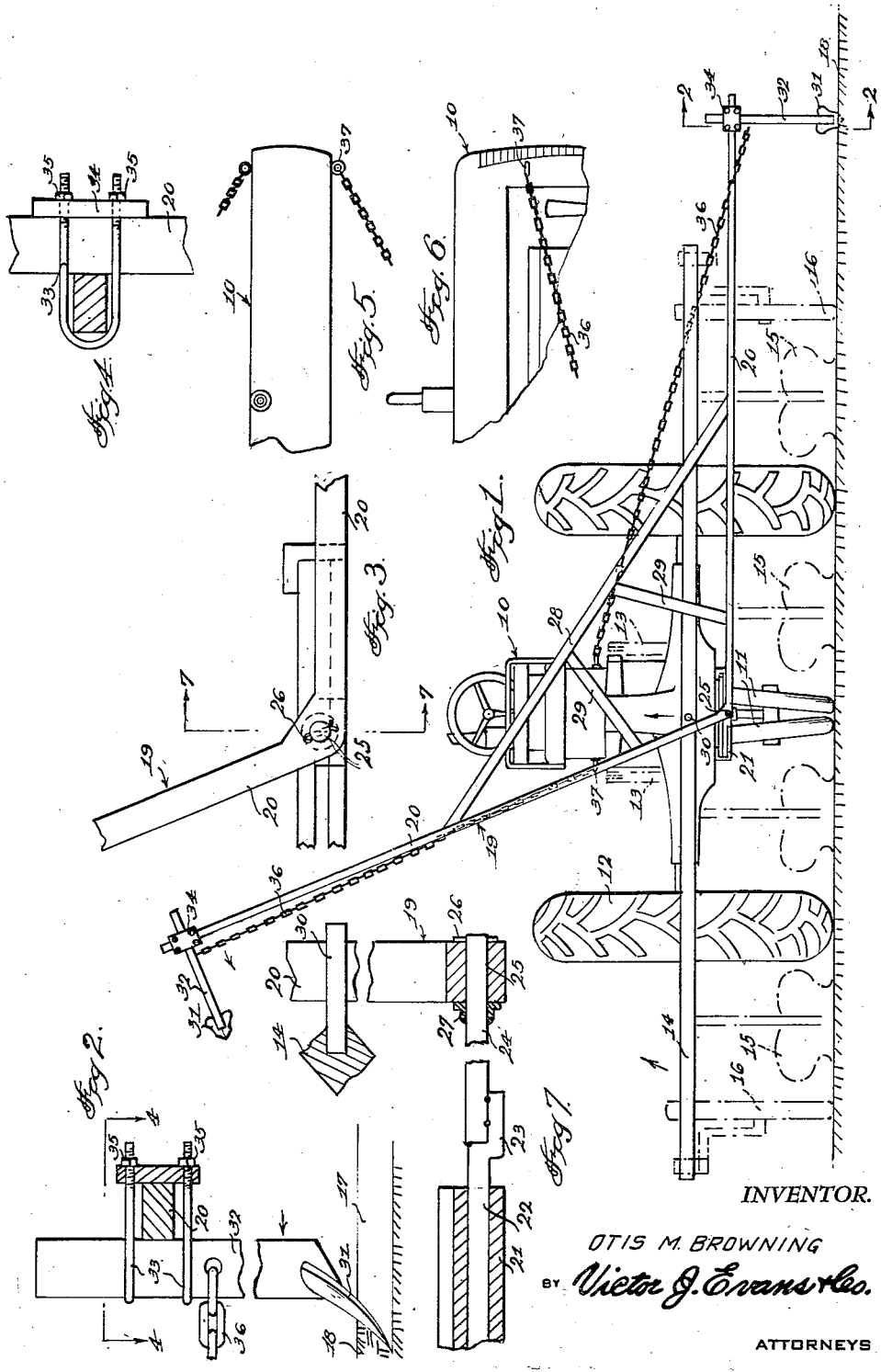
INVENTOR.
OTIS M. BROWNING
BY *Victor J. Evans & Co.*
ATTORNEYS

United States Patent Office 2,780,977
Patented Feb. 12, 1957

2,780,977
AUTOMATIC BEDDING MARKER

Otis M. Browning, Paducah, Tex.

Application December 20, 1955, Serial No. 554,364

4 Claims. (Cl. 97—230)

This invention relates to agricultural equipment, and more particularly to an automatic marking device for use with a tractor.

The object of the invention is to provide an automatic marking device which is adapted to be mounted behind and pulled by a tractor so that small furrows can be plowed in the ground whereby on succeeding trips, the front wheels of the tractor will be steered to the furrows to provide uniform beds.

Another object of the invention is to provide an automatic marking device for mounting behind a tractor so that furrows can be plowed in the ground accurately and easily so that as the tractor makes succeeding trips across the field, the wheels of the tractor will be properly steered in the aforementioned furrows.

A further object of the invention is to provide an automatic marking device which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a rear elevational view illustrating the marking device mounted on a tractor.

Figure 2 is a sectional view taken on the line 2—2 of Figure 1.

Figure 3 is a fragmentary rear elevational view illustrating the pivotal mounting between the body member and the tractor.

Figure 4 is a sectional view taken on the line 4—4 of Figure 2.

Figure 5 is a fragmentary top plan view showing the front portion of the tractor.

Figure 6 is a fragmentary side elevational view showing the tractor and chains, and with parts broken away.

Figure 7 is a sectional view taken on the line 7—7 of Figure 3.

Referring in detail to the drawings, the numeral 10 designates a portion of a conventional tractor which includes the usual front wheels 11 and rear wheels 12. There is further provided a beam 14 which extends transversely across the rear of the tractor 10, and the beam 14 is horizontally disposed. The beam 14 is adapted to be raised and lowered in the usual manner by means of the lift arms 13 which may be hydraulically actuated or controlled. The beam 14 may support the gauge wheels 16 as well as the lister bottoms 15.

The present invention is directed to a marking device which is adapted to form furrows such as the furrows 17 in the ground 18, and the marking device includes a frame or body member which is indicated generally by the numeral 19. The body member 19 includes a pair of arms 20 which may be made of any suitable material such as metal, and the arms 20 are arranged angularly with respect to each other and are secured together in any suitable manner, as for example by welding.

Extending rearwardly from the tractor 10 is the usual drawbar 21, Figure 7, and extending from the drawbar 21 and secured thereto is a rod 22 which is provided with an offset rear portion 23, Figure 7. A finger 24 may be secured as by welding to the rod 22, and the rear end of the finger 24 projects through an aperture or opening 25 at the junction of the arms 20 of the body member 19. The body member 19 is thus free to pivot on the finger 24, and a cotter pin or key 26 retains the body member on the finger 24. A collar 27 may be welded on the finger 24 to help retain the body member in its proper position on the finger.

Extending between the pair of arms 20 of the body member 19 and secured thereto in any suitable manner, is a cross piece 28. A pair of braces 29 extend between the cross piece 28 and the arms 20 and these braces may be secured in place in any suitable manner. Extending rearwardly from the beam 14 is a pin 30, and as the beam 14 is raised by means of the lift arms 13, the pin 30 will strike or engage one of the braces 29 to thereby pivot the body member 19 on the finger 24.

Arranged adjacent each end of the body member 19 is a plow 31 which is adapted to form the furrows 17. The plows 31 are mounted on the lower ends of standards 32. The standards 32 are adjustably connected to the arms 20 by U-bolts 33, Figure 2. A plate 34 may be connected to the U-bolts 33 for helping to retain the parts in their proper assembled position. Nuts 35 threadably engage the ends of the bolts 33.

There is further provided a pair of chains 36, and the chains 36 have their rear ends connected to the standards 32 in any suitable manner. The front ends of the chains 36 are adapted to be connected to the front portion of the tractor 10 in any suitable manner, as for example through the medium of the eye members 37, Figures 5 and 6.

From the foregoing, it is apparent that there has been provided an automatic marking assembly for use with a tractor such as the tractor 10. In use the marking device which consists of the body member 19 and its associated parts can be readily connected to the tractor as previously described. Thus, the finger 24 which is secured to the rear of the draw-bar 21 projects through the opening 25 whereby the body member 19 can pivot about an axis extending to the finger 24. One of the small plows 31 is mounted adjacent each end of each of the arms 20 so that for example the parts can be positioned as shown in Figure 1 whereby a furrow will be plowed or formed by the right hand plow 31, and as for example the furrows 17, shown in Figure 2 may be formed by the plow 31. When it is desired to form a furrow on the left side of the tractor, it is only necessary to raise the beam 14 by means of the lift arms 13 and this upward movement of the beam 14 will cause the pin 30 to strike the brace 29 thereabove so as to cause pivotal movement of the body member 19 whereby the other plow 31 will move down and engage the ground. At the same time the plow on the right side of the tractor will be raised out of engagement with the ground. The furrows 17 which are formed by the plows 31 can be used as guides for the front wheels 11 of the tractor 10 as the tractor makes succeeding trips to the field. By loosening the nuts 35, the standards 32 which carry the plows 31 can be raised or adjusted vertically or else they can be shifted along the arms 20 to the desired position and then the nuts 35 can be tightened. The chains 36 extend from the front of the tractor to the standards 32 so that the device is readily pulled along without any great strain or stress.

The chains 36 help in pulling the marking device, and the present invention is an automatic bedding marker. The purpose of the present invention is to plow a small furrow such as the furrow 17 in the unprepared ground to one side of the tractor so that on its succeeding return trips it is possible to keep the front wheels 11 of the tractor steered to the furrows 17 to provide uniform beds or large furrows. The initial trip in the field is made independently of the present invention with the aid of some sort of sighting device on the front of the tractor and an object on the opposite end of the field. Heretofore markers have been provided but it is believed that the present invention is superior to the previously constructed markers since the present invention has the following advantages. It can be easily and quickly attached to or detached from the tractor and it requires no attention from the tractor driver during operation. It is fully self operating since the plows 31 are lifted and lowered by the tractor power lift. It is simple in construction and has no complicated gadgets. It does not stay in the ground when the tractor is making its 180° turn at the end of the field to thereby eliminate the possibility of the device striking something during the turn. It is semi-floating so that when mounds or rises are encountered it will not tend to affect succeeding rows. The device can be readily adapted to be used with two, three, four and five row tractors. The numeral 14 designates the usual or conventional tool bar or beam of the tractor, which raises and lowers the plows hydraulically with the power lift arms 13. The numeral 21 designates the conventional draw-bar which is ordinarily used for pulling other vehicles or objects. The pin or finger 24 is secured to the draw-bar 21 and this finger extends far enough back for the marker to clear the plows. The marker body member has a hole 25 at the intersecting angle of the arms 20 which is slipped on the finger 24 which projects from the draw-bar and the whole device is balanced. The pin 30 may be secured to the center of the bar or beam 14 so that when the bar 14 is raised it causes the pin 30 to strike one of the braces 29 and this causes the marker to slip over to the opposite side. The small plows 31 do the marking and they are just pulled vertically and horizontally. The device can be made to fit different width rows or multi-row set-ups and the various parts such as the cross piece 28 and braces 29 may be made adjustable or telescopic. The chains pull the extended ends of the marker.

I claim:

1. In an automatic marking device, a draw-bar, a rod extending rearwardly from said draw-bar and including a rearwardly arranged offset portion, a finger secured to said offset portion, a body member including a pair of arms arranged angularly with respect to each other and secured together, there being an aperture in the central portion of said body member for receiving said finger, a cross piece extending between said arms and secured thereto, a pair of braces extending between said cross piece and arms and secured thereto, a horizontally disposed vertically adjustable beam arranged forwardly of said body member, a pin extending rearwardly from said beam for engagement with said braces as said beam is adjusted vertically, plows arranged contiguous to the outer ends of said arms, and means adjustably connecting said plows to said arms.

2. In an automatic marking device, a draw-bar, a rod extending rearwardly from said draw-bar and including a rearwardly arranged offset portion, a finger secured to said offset portion, a body member including a pair of arms arranged angularly with respect to each other and secured together, there being an aperture in the central portion of said body member for receiving said finger, a cross piece extending between said arms and secured thereto, a pair of braces extending between said cross piece and arms and secured thereto, a horizontally disposed vertically adjustable beam arranged forwardly of said body member, a pin extending rearwardly from said beam for engagement with said braces as said beam is adjusted vertically, plows arranged contiguous to the outer ends of said arms, and means adjustably connecting said plows to said arms, said means comprising standards extending upwardly from said plows, U-shaped bolts engaging said standards and arms, and plates connected to said U-shaped bolts.

3. In an automatic marking device, a draw-bar, a rod extending rearwardly from said draw-bar and including a rearwardly arranged offset portion, a finger secured to said offset portion, a body member including a pair of arms arranged angularly with respect to each other and secured together, there being an aperture in the central portion of said body member for receiving said finger, a cross piece ejtending between said arms and secured thereto, a pair of braces extending between said cross piece and arms and secured thereto, a horizontally disposed vertically adjustable beam arranged forwardly of said body member, a pin extending rearwardly from said beam for engagement with said braces as said beam is adjusted vertically, plows arranged contiguous to the outer ends of said arms, and means adjustably connecting said plows to said arms, said means comprising standards extending upwardly from said plows, U-bolts engaging said standards and arms, plates connected to said U-bolts, and chains having their rear ends connected to said standards and their front ends adapted to be connected to the front portion of a tractor.

4. In combination with a tractor having lift arms, a tool beam connected to said lift arms for vertical adjustment thereby and a draw-bar, a marking device including a body member pivotally connected to said draw-bar and comprising a pair of angularly arranged arms, plows mounted on the outer ends of said arms, and interengaging means on said marking device and tool beam for pivoting said marking device about said draw-bar when said tool beam is vertically adjusted.

References Cited in the file of this patent

UNITED STATES PATENTS

| | | |
|---|---|---|
| 1,168,930 | Brown | Jan. 18, 1916 |
| 1,274,954 | Stuart | Aug. 6, 1918 |
| 2,608,147 | Ezzell | Aug. 26, 1952 |
| 2,633,787 | Nelson | Apr. 7, 1953 |